United States Patent [19]
Hickson et al.

[11] Patent Number: 6,094,694
[45] Date of Patent: Jul. 25, 2000

[54] SYSTEM FOR STORING NEW MESSAGES IN BOTH FULL-LENGTH AND ABBREVIATED VERSIONS OF MESSAGE EXPIRATION DATA, AND ELIMINATING OLD, EXPIRED MESSAGES WHEN A MESSAGE IS RETRIEVED

[75] Inventors: Andrew Hickson, West Wellow; James Gordon Wilkinson, Netley Abbey, both of United Kingdom

[73] Assignee: International Business Machines Corporation, Armonk, N.Y.

[21] Appl. No.: 09/071,800

[22] Filed: May 4, 1998

[30] Foreign Application Priority Data

Oct. 4, 1997 [GB] United Kingdom .................. 9720999

[51] Int. Cl.⁷ .................................................. G06F 13/00
[52] U.S. Cl. .............................. 710/54; 709/220; 710/55; 711/118; 711/128; 711/136; 711/202; 455/564
[58] Field of Search ........................ 710/54, 55; 711/118, 711/202, 128, 136; 709/220; 455/564

[56] References Cited

U.S. PATENT DOCUMENTS

| | | | |
|---|---|---|---|
| 5,634,027 | 5/1997 | Saito | 395/403 |
| 5,649,155 | 7/1997 | Krumm et al. | 395/455 |
| 5,751,993 | 5/1998 | Ofek et al. | 395/463 |
| 5,787,247 | 7/1998 | Norin et al. | 395/200.5 |
| 5,875,405 | 2/1999 | Honda | 455/564 |
| 5,951,657 | 9/1999 | Wood et al. | 710/55 |
| 5,959,542 | 9/1999 | Ishida | 340/825.44 |

FOREIGN PATENT DOCUMENTS

| | | |
|---|---|---|
| 0-618-534-A2 | 10/1994 | European Pat. Off. . |
| WO 95/10805 | 4/1995 | WIPO . |

Primary Examiner—Thomas C. Lee
Assistant Examiner—Thuan Du
Attorney, Agent, or Firm—Kevin J. Fournier

[57] ABSTRACT

A data processing apparatus runs a messaging and queuing software package whereby messages received at the data processing apparatus are stored in a message queue. The apparatus has: a processor; a high storage capacity storage device; and a low storage capacity storage device (e.g., a high-speed cache); the high storage capacity storage device stores full-length expiration data for each message in the message queue; and the low storage capacity storage device stores an abbreviated version of the full-length expiration data for each message in the message queue, the abbreviated version used to quickly and efficiently determine whether a queued message is expired.

19 Claims, 2 Drawing Sheets

SYSTEM FOR STORING NEW MESSAGES IN BOTH FULL-LENGTH AND ABBREVIATED VERSIONS OF MESSAGE EXPIRATION DATA, AND ELIMINATING OLD, EXPIRED MESSAGES WHEN A MESSAGE IS RETRIEVED

FIELD OF THE INVENTION

The invention broadly relates to the field of data processing and more specifically to the field of asynchronous messaging and queuing software systems for use in a data processing system.

BACKGROUND OF THE INVENTION

Just as computers have become more and more prevalent in everyday life, networks of linked computers have become important in distributing information amongst computer users. Through such networks, computer users can share information creating a virtual publishing medium which has become a viable alternative for the print medium.

A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

In order to account for the fact that different computers connected to such a network may operate using different protocols and/or data formats, and also that different computers may be located in different time zones, asynchronous messaging and queuing software products have been developed.

Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). IBM and MQSeries are trademarks of IBM Corporation. IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328, which are incorporated herein by reference.

In such a messaging and queuing system, the computer system that receives information over the network stores such received information in the form of messages in a queue. The computer system need not be operable when the messages are received over the network (e.g, the computer may be turned off if it is the middle of the night in the local time zone). The messages are simply stored in the queue for later retrieval at a time when the receiving computer system makes a request to retrieve a message from the queue. The receiving computer processor requests a specific message from the queue and this message is dequeued and provided to the receiving computer processor for processing thereby.

As is apparent from the above, a particular message is not dequeued until the receiving processor specifically asks for the message. Thus, there is a good chance that some messages are never asked for by the receiving processor and thus end up remaining on the queue for a long period of time. This takes up much storage space in the receiving computer's long term storage (e.g., hard drive) as each queued message has a large amount of stored data associated therewith.

Thus, it has been known to associate expiration data with each queued message and to store this expiration data in long term storage. The expiration data for a particular message includes (in the IBM MQSeries product) a 64-bit field for indicating, with a granularity of 1 millisecond, exactly when this message was placed in the queue (i.e., when the message was received over the network), and also a 32-bit field for indicating, with a granularity of 0.1 seconds, an expiry period (a total length of time during which the message is considered still current).

When the receiving processor requests a specific message from the queue, that message's expiration data is checked (in long term storage) and if the message has expired (expiry period has elapsed) the message is deleted from the queue. This frees up the long term storage for the receipt of more messages. There is then an automatic re-issue of the request to receive the specific message and, for example, a later version of that message is taken off of the queue and returned to the processor.

A major problem with this technique, however, is that in order for a queued message to be considered expired, the receiving computer's processor must have specifically asked for this message to be taken off of the queue. If a particular queued message is never asked for, it could remain on the queue for a long period of time, even years. This could take up a substantial amount of long term memory storage space and results in a very inefficient design.

An improvement has previously been proposed whereby when the processor is looking for a particular message in the queue, it checks the expiration data stored in long term storage for each of the intermediate queued messages that it comes across, deleting the messages that are expired. However, this process requires that long term storage be accessed for each of the intermediate messages, which can take much time, and thus still results in an inefficient design.

SUMMARY OF THE INVENTION

According to a first aspect, the present invention provides a method for eliminating time-expired messages from a message queue within a data processing system, the method having steps of: when a new message is received at the data processing system, adding the new message to the message queue, storing associated message data, including full-length message expiration data, in a high storage capacity storage device, forming an abbreviated version of the full-length message expiration data and storing it in a low storage capacity storage device; and when a specific message is requested to be retrieved from the message queue, accessing the low storage capacity storage device, comparing the abbreviated version of the full-length message expiration data for at least one message in the queue with the current date and time, eliminating a queued message having an abbreviated version of the full-length message expiration data that has a value less than or equal to the current date and time, and retrieving the specific message from the message queue.

Preferred features of the first aspect are as follows.

After retrieving the specific message from the message queue, a further expiration data check is performed using the full-length message expiration data. The low storage capacity storage device is a cache memory. The high storage capacity storage device is a hard disk drive.

According to second and third aspects, the invention also provides an apparatus for carrying out the method described above and also provides a computer program product stored on a computer readable storage medium for, when run on a data processing system, carrying out the method described above.

According to a fourth aspect, the invention provides a data processing apparatus running a messaging and queuing software package whereby messages received at the data processing apparatus are stored in a message queue, said apparatus comprising: a processor; a high storage capacity storage device; and a low storage capacity storage device; wherein said high storage capacity storage device stores full-length expiration data for each message in said message queue; and wherein said low storage capacity storage device stores an abbreviated version of said full-length expiration data for each message in said message queue, the abbreviated version is used to determine whether a message in the queue has expired.

In this fourth aspect, preferably, the low storage capacity storage device is a cache memory and the high storage capacity storage device is a hard disk drive.

Thus, by placing an abbreviated version of the expiration date and time in a low storage capacity storage device, such as a cache memory, the queued messages presently residing on the queue can be quickly and easily checked to determine which messages are expired, when a message is requested from the queue. This results in a highly efficient way to eliminate expired messages from the queue, thus freeing up much extra storage space in long term memory which otherwise would have been filled with data associated with useless expired messages.

This level of efficiency was not attainable before because the expiration data, in the prior art, was stored in long term storage, and contained a relatively large number of bits to represent it. By creating an abbreviated version of this expiration data with a smaller number of bits to represent it, the abbreviated version can be stored in a memory having a smaller capacity yet a higher access speed (e.g., a cache) so that the expiration data for messages in the queue can be easily checked against the current date and time whenever a message is requested from the queue.

DETAILED DESCRIPTION OF THE PREFERRED EMBODIMENTS

Figure 1:
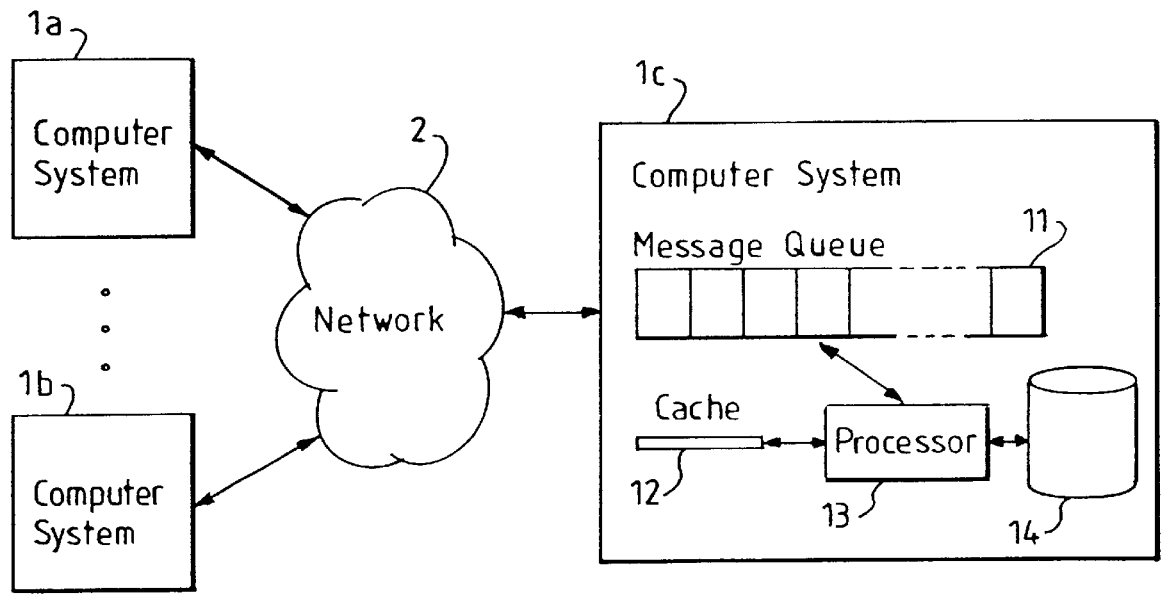
FIG. 1 is a block diagram of a network of linked computers, forming the environment in which a preferred embodiment of the present invention operates.

As shown in FIG. 1, a plurality of computer systems 1a, 1b, 1c are interconnected via a network 2 (which could be the public Internet or a private intra-corporate Intranet or wide area network). One (1c) of the computer systems is shown expanded so as to illustrate its key components in the preferred embodiment of the present invention. Computer system 1c has a processor 13 for controlling the overall operation of the computer system 1c, a high speed cache memory 12, a long-term storage device 14 (e.g., hard disk drive) and a message queue 11. It should be noted that the message queue 11 would usually exist in the long-term storage device 14, but these two items have been shown separately in the Fig. for functional clarity.

Whenever a new message destined for computer system 1c is received over network 2 from one of the other computer systems (e.g., 1a or 1b) the message is stored in the message queue 11. The data associated with the message is stored in long term storage 14. When the processor 13 requests that a particular message be dequeued, that message's associated data is retrieved from storage 14 and provided to processor 13.

Figure 2:
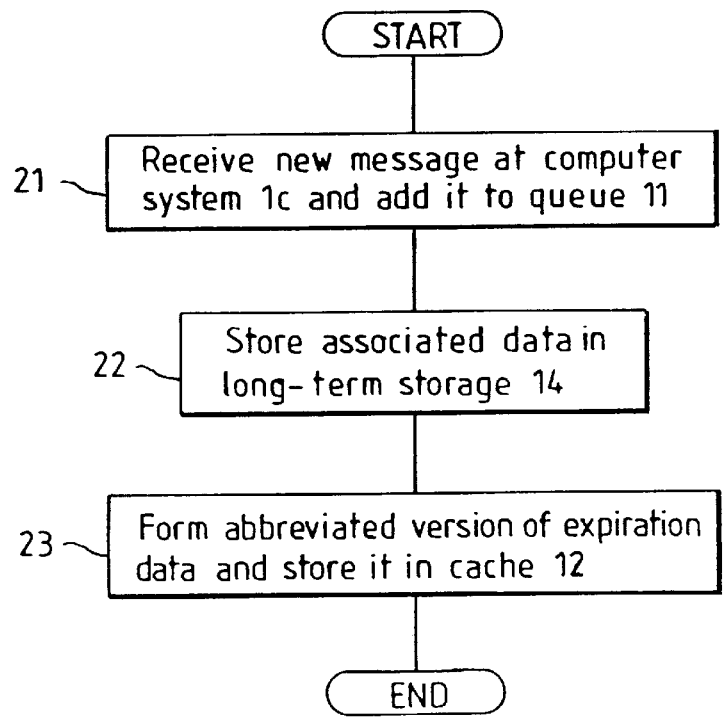
FIG. 2 is a flowchart showing the programming steps involved when a new message is received, according to a preferred embodiment of the present invention.

The operation of a preferred embodiment of the present invention will now be described by reference to FIG. 1 and the flowcharts of FIGS. 2 and 3.

The operation starts when a new message is received at computer system 1c over network 2 (step 21). The data associated with the message is stored (step 22) in long term storage 14, as in the prior art. However, according to a preferred embodiment of the present invention, the processor also forms (step 23) an abbreviated version of the expiration data and stores the result in cache 12.

The complete expiration data for the received message, as stored in long term storage 14 and as was used in the prior art MQSeries technique described above consisted of a 64-bit field and a 32-bit field, which were combined together to form a highly precise expiration time of granularity 1 millisecond. At step 23, the preferred embodiment of the present invention creates a less-precise 24-bit abbreviated version of the full-length expiration data represented with more precision in the 64-bit and 32-bit fields. The new 24-bit abbreviated expiration data has a granularity of 4 minutes, due to the reduced number of bits used to represent this data. A 24-bit field was chosen in the preferred embodiment as it will be satisfactory to represent a wide range of expiration dates. However, different size fields could also be used.

As an example, assume a message has a full-length expiration data value of 1:13356 Sep. 19, 1999. This means that this message should be considered by the system as expired on Sep. 19, 1999 and specifically at 1:13 am, and even more specifically at 1:13356. According to a preferred embodiment of the invention, the abbreviated expiration date value is determined to be 1:14 am.

Figure 3:
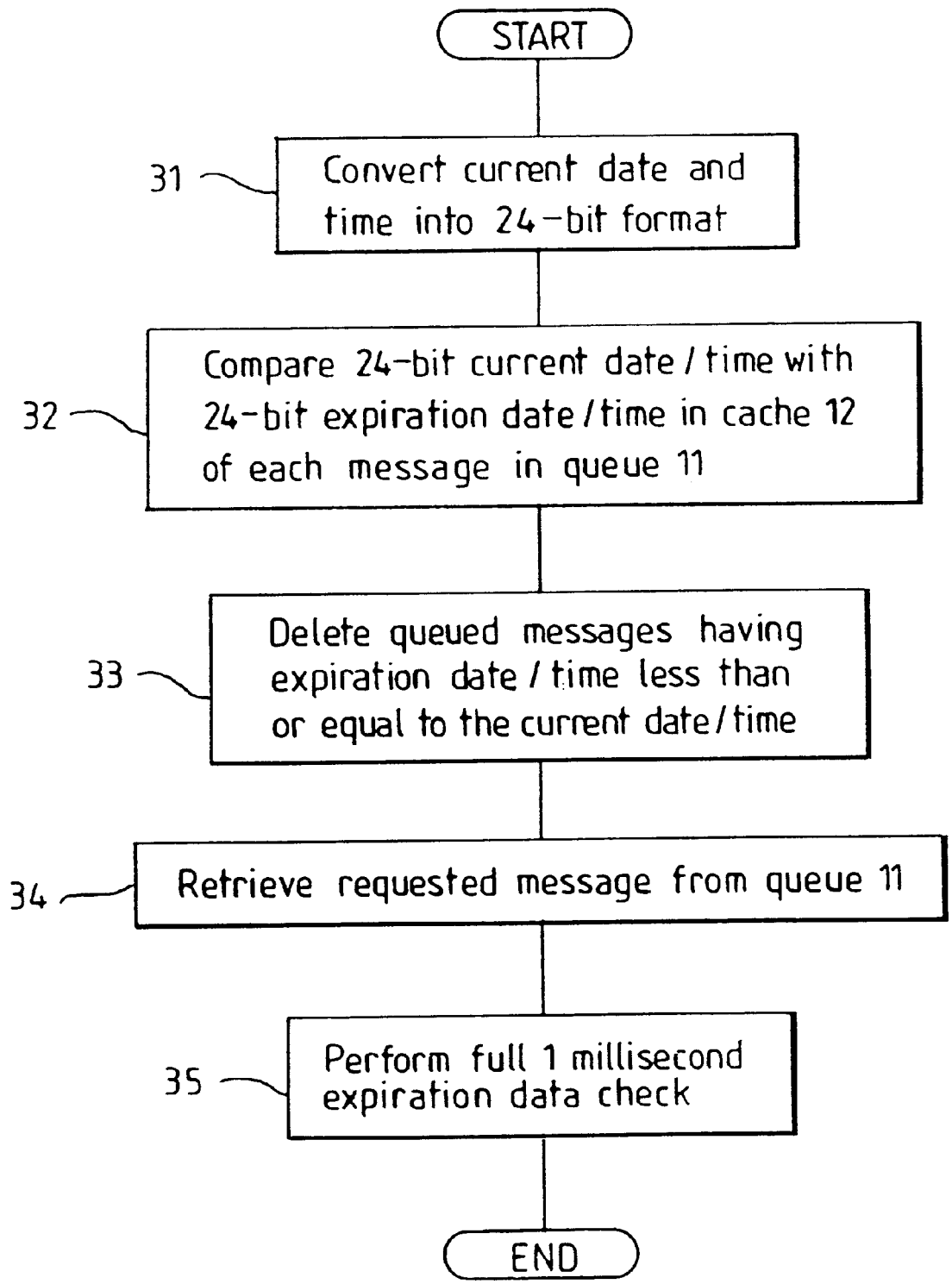
FIG. 3 is a flowchart showing the programming steps involved when a message is being requested from the queue, according to a preferred embodiment of the present invention.

When the processor wishes to retrieve a particular message from the queue 11, the steps shown in FIG. 3 are carried out. At step 31, the processor converts the current date and time into the 24-bit format. Then, at step 32, the processor accesses the cache 12 and compares the 24-bit current date/time with the 24-bit expiration date/time data for each message in the queue 11. If the value of a particular message's 24-bit expiration date/time data is less than or equal to the 24-bit current date/time, that particular message is determined to be expired and it is deleted (step 33) from the queue 11 (and its associated message data is deleted from long term storage 14).

The processor 13 then retrieves from the queue 11 the specific message that was requested (step 34). Once the message is found, the processor 13 then retrieves the complete expiration data from long term storage of this message and performs a full 1 millisecond expiration check (as was done in the prior art) to determine whether this message has become expired within the last four minutes. If it has, the message is deleted and, as was also done in the prior art, the processor looks for another candidate message in the queue.

Thus, with the present invention, long expired messages (e.g., ones that have been expired by at least four minutes in the preferred embodiment) are discarded much more efficiently as compared to the prior art.

It should be noted that there is a tradeoff involved with deciding the number of queued messages which will have their abbreviated expiration data checked. If too many are checked, it will take longer to get to the required message. However, if too few are checked, expired messages will not be found and deleted. In the above example, the abbreviated expiration data for all messages is checked. However, other implementations would choose a different number (e.g., every other message).

We claim:

1. A method for eliminating time-expired messages from a message queue within a data processing system, the method having steps of:
   when a new message is received at the data processing system, adding the new message to the message queue, storing associated message data, including full-length message expiration data, in a high storage capacity storage device, forming an abbreviated version of the full-length message expiration data and storing it in a low storage capacity storage device; and
   when a specific message is requested to be retrieved from the message queue, accessing the low storage capacity storage device, comparing the abbreviated version of the full-length message expiration data for at least one message in the queue with the current date and time, eliminating a queued message having an abbreviated version of the full-length message expiration data that has a value less than or equal to the current date and time, and retrieving the specific message from the message queue.

2. The method of claim 1 wherein, after retrieving the specific message from the message queue, a further expiration data check is performed using the full-length message expiration data.

3. The method of claim 1 wherein said low storage capacity storage device is a cache memory.

4. The method of claim 1 wherein said high storage capacity storage device is a hard disk drive.

5. The method of eliminating time expired messages from a message queue of claim 1, wherein the messages have been received over a network from at least one other data processing system via an asynchronous message queuing transport protocol.

6. An apparatus for eliminating time-expired messages from a message queue within a data processing system, the apparatus comprising:
   means for, when a new message is received at the data processing system, adding the new message to the message queue, storing associated message data, including full-length message expiration data, in a high storage capacity storage device, forming an abbreviated version of the full-length message expiration data and storing it in a low storage capacity storage device; and
   means for, when a specific message is requested to be retrieved from the message queue, accessing the low storage capacity storage device, comparing the abbreviated version of the full-length message expiration data for at least one message in the queue with the current date and time, eliminating a queued message having an abbreviated version of the full-length message expiration data that has a value less than or equal to the current date and time, and retrieving the specific message from the message queue.

7. The apparatus of claim 6 wherein, after retrieving the specific message from the message queue, a further expiration data check is performed using the full-length message expiration data.

8. The apparatus of claim 6 wherein said low storage capacity storage device is a cache memory.

9. The apparatus of claim 6 wherein said high storage capacity storage device is a hard disk drive.

10. The apparatus for eliminating time expired messages from a message queue of claim 6, wherein the messages have been received over a network from at least one other data processing system via an asynchronous message queuing transport protocol.

11. A data processing apparatus running a messaging and queuing software package whereby messages received at the data processing apparatus are stored in a message queue, said apparatus comprising:
    a processor;
    a high storage capacity storage device; and
    a low storage capacity storage device;
    wherein said high storage capacity storage device stores full-length expiration data for each message in said message queue; and
    wherein said low storage capacity storage device stores an abbreviated version of said full-length expiration data for each message in said message queue, the abbreviated version is used to determine whether a message in the queue has expired.

12. The apparatus of claim 11 wherein said low storage capacity storage device is a cache memory.

13. The apparatus of claim 11 wherein said high storage capacity storage device is a hard disk drive.

14. The apparatus for eliminating time expired messages from a message queue of claim 11, wherein the messages have been received over a network from at least one other data processing system via an asynchronous message queuing transport protocol.

15. A computer program product stored on a computer readable storage medium for, when run on a data processing system, instructing the data processing system to carry out a method for eliminating time-expired messages from a message queue, the method having steps of:
    when a new message is received at the data processing system, adding the new message to the message queue, storing associated message data, including full-length message expiration data, in a high storage capacity storage device, forming an abbreviated version of the full-length message expiration data and storing it in a low storage capacity storage device; and
    when a specific message is requested to be retrieved from the message queue, accessing the low storage capacity storage device, comparing the abbreviated version of the full-length message expiration data for at least one message in the queue with the current date and time, eliminating a queued message having an abbreviated version of the full-length message expiration data that has a value less than or equal to the current date and time, and retrieving the specific message from the message queue.

16. The computer program product of claim 15 wherein, after retrieving the specific message from the message queue, a further expiration data check is performed using the full-length message expiration data.

17. The computer program product of claim 15 wherein the low storage capacity storage device is a cache memory.

18. The computer program product of claim 15 wherein the high storage capacity storage device is a hard disk drive.

19. The computer program product of claim 15 wherein the messages have been received over a network from at least one other data processing system via an asynchronous message queuing transport protocol.

* * * * *